April 18, 1950   I. M. TENBORG   2,504,756
PIE AND CAKE CUTTER
Filed Jan. 21, 1949
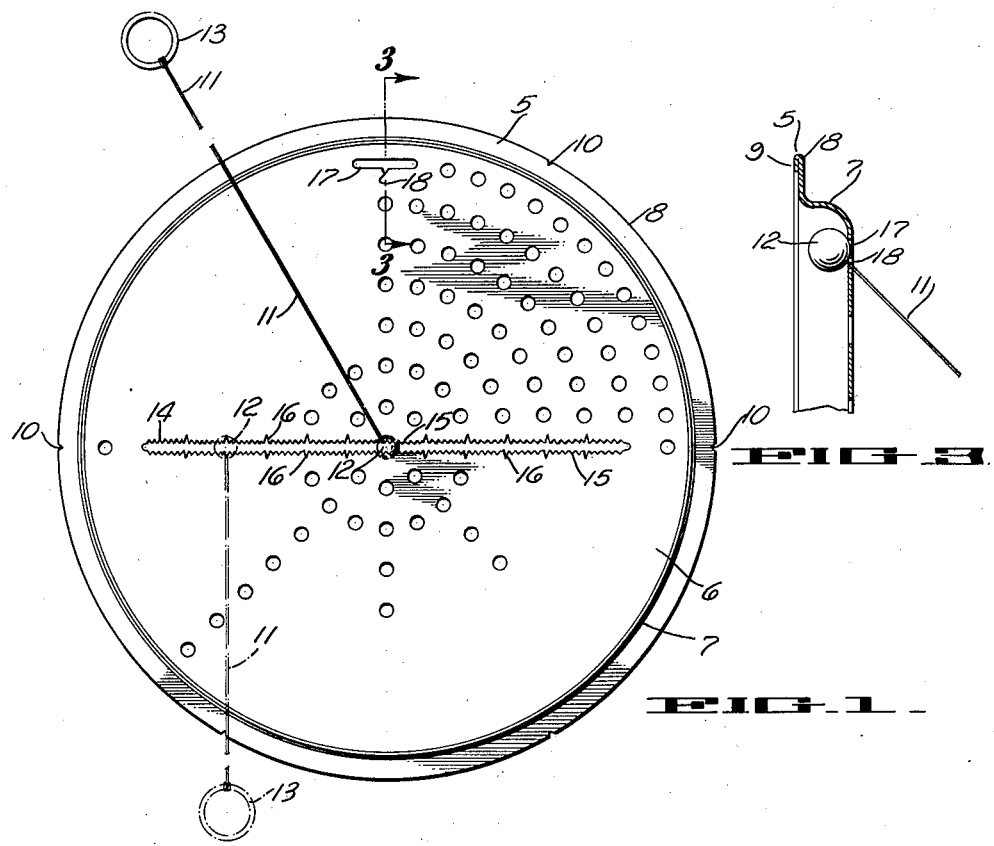
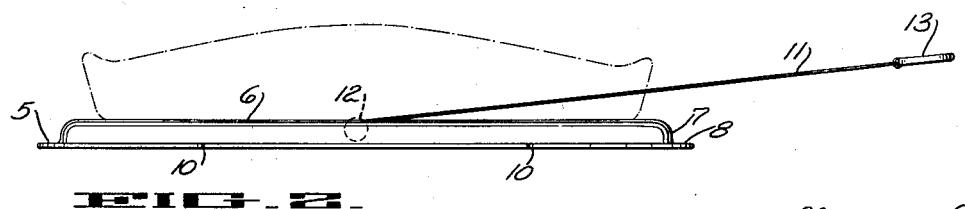
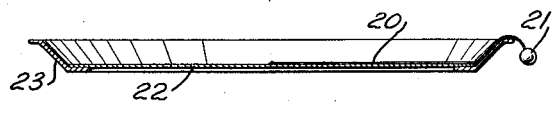
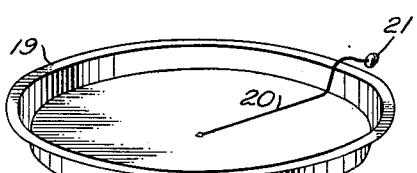
INVENTOR.
IONA M. TENBORG
BY
atty.

Patented Apr. 18, 1950

2,504,756

UNITED STATES PATENT OFFICE 2,504,756

PIE AND CAKE CUTTER

Iona M. Tenborg, Richmond, Calif.

Application January 21, 1949, Serial No. 71,987

2 Claims. (Cl. 30—114)

This invention relates to kitchen utensils, and more particularly to devices for cutting pies, cakes and the like.

It has been found that when cutting pies, cakes, pastry or other bakery products with a knife or similar edged tool, it is extremely difficult to perform this operation in such a manner as to produce portions of the article being cut which retain an appearance of crispness and freshness. This wholesome appearance is important from a standpoint of stimulating the appetite, and especially so in restaurants, or other public eating places, where portions of pies and cakes are on display for the benefit of the patrons. Cakes, covered with soft icing present an especially difficult problem as the icing adhering to the sides of the blade accumulates in such proportions as to render impossible a clean severance of the cake. A further difficulty incidental to cutting bakery products into individual portions is the necessity for producing a given number of pieces of uniform size. Estimating the location of the cuts to be made, by means of the eye, is frequently at fault, consequently variation in size of the individual portions often results.

It is an object of the present invention to provide a device for the cutting of pies, cakes and the like, which will enable the user to make clean cuts without any mutilation, crushing, or other objectionable deformation of the article being severed.

Another object of the invention is the provision of a device as described which will enable the user to produce individual portions of uniform shape and size.

A further object of the invention is the provision of a cutter adapted to the cutting of circular articles along diametrical or radial lines, as well as the cutting of square or rectangular bakery products into similar shaped portions.

The invention possesses other objects and features of advantage, some of which, with the foregoing, will be set forth in the following description of the preferred form of the invention which is illustrated in the drawing accompanying and forming part of the specification.

Referring to the drawing:

Figure 1 is a plan view of an embodiment of my improved cutter.

Figure 2 is an elevation of the cutter.

Figure 3 is an enlarged fragmentary section taken on line 3—3 of Figure 1.

Figure 4 is a perspective view of a modified combined container and cutter.

Figure 5 is a sectional view of a modified form of the embodiment shown in Figure 4.

Referring to the drawing in detail, and with particular reference to Figures 1, 2 and 3, a preferred embodiment of my invention is illustrated thereon, and comprises in general a base or plate for the reception of the article to be cut, and an attached cutting wire or string, mounted for manual operation, and being universally adjustable. The base or plate 5 which may be circular as shown, or shaped differently as desired, presents primarily a flat upper surface 6 upon which the pie or cake is to be placed. This upper surface 6 is bounded by a downwardly flanged wall 7 in order to give the article the necessary degree of rigidity, and which in turn, is formed with a laterally extending rim portion 8 having a rolled edge 9 adapted to give the device a finished appearance, and present a smooth and rounded edge so as not to constitute a hazard to the hands of the user. Perforations are made in the material as indicated for the cooling effect they provide, and also to eliminate the possibility of any suction which may cause a pie or cake to adhere to the surface upon which it rests. Notches 10 are provided around the edge of the rim portion 8 to aid the operator in producing portions of uniform size, and may be of a number and spacing as found desirable.

The attached cutter consists of a fine wire or thread 11 of sufficient length to stretch entirely across the plate 5 and which has secured thereto a pivotal stop illustrated as a ball 12 on one end thereof, and a handle in the preferred form of a ring 13, on the other end. A diametrical slot 14 has been provided in the plate 5, and is only of sufficient width to permit the ring or handle 13 to be passed therethrough from the underside of the plate 5. The thread or wire 11 is then drawn through the slot until the ball 12 contacts the sides of the slot, and, being of a larger diameter than the width of the slot, acts as a stop; but, being able to roll against the contiguous edges of the plate, permits angular movement of the wire 11 in any direction.

Complementary arcuate notches 15, concentric with the plate 5, are provided at the center of the slot 14 and form an anchoring recess for the reception of the ball 12 when the cutter is being used to make radial cuts as illustrated in solid lines on Figure 1. Serrations 16 of suitable spacing are also provided along the edges of the slot 14 and serve to anchor the wire or thread 11 in place when cutting articles into rectangular or square form as indicated in phantom on Figure 1. A smaller slot 17 of sufficient size to permit the passage therethrough of the ring 13 has been located adjacent the edge of the plate 5 and is formed with an inwardly directed anchoring notch 18. When it is desired to cut entirely across an article, the cutter is secured in place in this slot as indicated on Figure 3.

In using the device for the radial cutting of circular articles, the pie or cake is placed upon the surface 6 of the plate and concentrically located therewith. The cutter 11 which is preferably at an initial position at one end of the slot 14 is manipulated by inserting a finger into, or otherwise grasping the ring 13, and drawing the wire taut, pulling it inwardly toward the center and along the slot 14 until the ball 12 seats itself in the notches 15. Radial cuts are then made by swinging the wire outwardly and downwardly as shown on Figure 2, utilizing the notched graduations 10 as desired. Square cuts are made in similar fashion, the wire 11 being anchored in the desired location in the slot 14 for each individual cut and then operated in a plane perpendicular to the slot. The plate 5 is so constructed that if desired it can be used in the reverse position and the ring 13 and wire 11 can be inserted from the opposite direction.

In the embodiment illustrated on Figure 4 a pie plate 19 usually formed of cardboard or the like, is provided with a centrally attached cutting thread 20 having a small tab 21 secured to the end thereof to form a handle. By this means it is possible to provide an inexpensive method of cutting pies right in the containers in which they are shipped. The initial cut, in this case, is made by pulling the thread 20 in an upward direction until it reaches the center. It can then be aligned and manipulated in the usual manner to complete the cutting operation.

Also, if desired, the plate may be formed with a removable bottom 22 loosely seated in a circular flanged rim or side member 23. In this embodiment the cake or pie may be removed from the flange 23 while being continuously supported upon the bottom 22. Thus, the cutting wire or thread may be operated to completely section the pie or cake resting up the bottom 22 without interference from the sides of the plate.

While I have disclosed preferred embodiments of my invention it should be understood that modifications may be made within the spirit and scope of the appended claims.

I claim:
1. A pie and cake cutter comprising a base plate having an upper article-supporting surface and a lower surface, said plate having slot means therein extending along a portion of the length thereof, cutting means including a thread extending through said slot, a member having its smallest dimension larger than the width of said slot secured to one end of said thread and positioned adjacent said lower surface, the other end of said thread extending from the upper surface of said base plate for a distance at least sufficient to reach the periphery of said plate, said slot means including transverse notches, said notches providing stops whereby said member may be selectively and releasably held against displacement in said stops as the thread is moved over the upper surface of the plate and through an article which may be supported thereon.

2. An article of the class described comprising a substantially circular base plate having an upper article-supporting surface and a slot extending substantially diametrically thereacross, cutting means including a thread having a spherical ball secured to one end thereof and hand gripping means at the other end thereof, said thread extending through the slot with said ball lying adjacent the lower surface of the plate, means on said plate adjacent said slot forming a plurality of seats for said ball whereby the latter may be selectively positioned along the length of the slot.

IONA M. TENBORG.

REFERENCES CITED

The following references are of record in the file of this patent:

UNITED STATES PATENTS

| Number | Name | Date |
|---|---|---|
| 852,107 | Cunningham | Apr. 30, 1907 |
| 1,864,921 | Mayer | June 28, 1932 |
| 2,085,372 | Lenk | June 29, 1937 |
| 2,278,774 | Fest | Apr. 7, 1942 |